(12) United States Patent
Warner et al.

(10) Patent No.: US 6,665,655 B1
(45) Date of Patent: Dec. 16, 2003

(54) IMPLICIT RATING OF RETRIEVED INFORMATION IN AN INFORMATION SEARCH SYSTEM

(75) Inventors: Douglas K. Warner, Bozeman, MT (US); Michael A. Myer, Bozeman, MT (US)

(73) Assignee: Rightnow Technologies, Inc., Bozeman, MT (US)

( * ) Notice: Subject to any disclaimer, the term of this patent is extended or adjusted under 35 U.S.C. 154(b) by 0 days.

(21) Appl. No.: 09/549,669

(22) Filed: Apr. 14, 2000

(51) Int. Cl.[7] .............................................. G06F 17/30
(52) U.S. Cl. .................................. 707/2; 707/5; 707/3
(58) Field of Search ................................ 707/2, 3, 5, 7, 707/6, 10, 104; 709/219

(56) References Cited

U.S. PATENT DOCUMENTS

| | | | | |
|---|---|---|---|---|
| 5,724,567 A | * | 3/1998 | Rose et al. ..................... | 707/2 |
| 5,737,734 A | * | 4/1998 | Schultz ........................... | 707/5 |

(List continued on next page.)

FOREIGN PATENT DOCUMENTS

| | | | | |
|---|---|---|---|---|
| EP | 551696 | 7/1993 | ......... | G06F/15/419 |
| WO | WO 99/48028 | 9/1999 | ........... | G06F/17/30 |
| WO | WO 01/16807 | 3/2001 | ........... | G06F/17/30 |

OTHER PUBLICATIONS

Mobasher et al., "Creating adaptive Web sites through usage–based clustering of URLs", *Knowledge and Data Egineering Exchange, 1999.* (KDEX '99); Proceedings. 1999 Workshop on Chicago, IL, USA, Nov. 7, 1999; Los Alamitos, CA, USA, IEEE Comput. Soc., US, 2000, pp. 19–25.

Page et al., "The PageRank citation Ranking: Bringing Order to the Web", *Stanford Digital Library Technologies Project.* Stanford Digital Library Technologies Project, Online. Jan. 29, 1998, pp. 1–17.

*Primary Examiner*—Sanjiv Shah
(74) *Attorney, Agent, or Firm*—Dorsey & Whitney LLP

(57) ABSTRACT

An information retrieval system allows a user to search a database of informational items for a desired informational item, and presents the search result in the form of matching index entries in the order of relevance. The information retrieval system in accordance with the principles of the present invention assigns a relevance rating to each of the index entries without requiring an explicit input from the user with respect to the usefulness or the relevance of the retrieved information corresponding to the respective index entries. When the user selects and retrieves an informational item through a list of index entries presented by the retrieval system, as a result of a search, the relevance rating of the selected informational item is increased by a predetermined amount. The relevance rating of the selected informational item is further adjusted based on any actions the user takes subsequent to the initial selection of the informational item if the subsequent act indicates that the relevance of the selected informational item may be less than what is reflected by the rating increase by the predetermined amount. Ratings of the informational items in the database are determined from implicit suggestions from the usage of the retrieval system and the database by the user rather than from an explicit user input. In another aspect of the present invention, the ratings are allowed to decay over time to minimize the tendencies for historical usage biased rating, and to provide more temporally accurate ratings. The most recently accessed time of each of the informational items in the database is compared to a predetermined stale access time threshold, and if the most recently accessed time is older than the threshold, than the rating of the corresponding informational item is decreased to reflect the dated nature of the information contained within the item.

26 Claims, 5 Drawing Sheets

U.S. PATENT DOCUMENTS

| | | |
|---|---|---|
| 5,870,740 A | 2/1999 | Rose et al. |
| 6,012,053 A * | 1/2000 | Pant et al. ............... 707/3 |
| 6,021,409 A | 2/2000 | Burrows ............... 707/102 |
| 6,055,542 A * | 4/2000 | Nielsen et al. ......... 707/104 |
| 6,108,493 A * | 8/2000 | Miller et al. ........... 709/219 |
| 6,119,114 A * | 9/2000 | Smadja ............... 707/7 |
| 6,256,633 B1 * | 7/2001 | Dharap ............... 707/10 |
| 6,327,590 B1 * | 12/2001 | Chidlovskii et al. ...... 707/5 |
| 6,353,825 B1 * | 3/2002 | Ponte ............... 707/5 |

* cited by examiner

| INFORMATION ITEM | LOCATION | RELEVANCY RATING | ACCESS TIME |
|---|---|---|---|
| ITEM 1 | LOCATION 1 | 36 | TIME 1 |
| ITEM 2 | LOCATION 2 | 75 | TIME 2 |
| ITEM 3 | LOCATION 3 | 113 | TIME 3 |
| ITEM 4 | LOCATION 4 | 224 | TIME 4 |
| • | • | • | • |
| ITEM N | LOCATION N | $R_R N$ | TIME 5 |

FIG. 2

IMPLICIT RATING OF RETRIEVED INFORMATION IN AN INFORMATION SEARCH SYSTEM

RELATED APPLICATION

The present application is related to an application for US Letters patent, entitled "Temporal Updates of Relevancy Rating of Retrieved Information in an Information Search System," U.S. application Ser. No. 09/549,566, filed Apr. 14, 2000 by the present inventors and assigned to the assignee of the present application.

TECHNICAL FIELD

The present invention generally relates to information search and retrieval systems. More particularly the present invention relates to implicitly establishing a relative ranking among information objects retrieved as a result of an information search in an information search and retrieval system.

BACKGROUND ART

A database is useful only if a desired item can be efficiently found and retrieved therefrom. To locate and retrieve a desired information item in an information database, a search of the database, e.g., based on a keyword or a text string, may be required. The search typically involves finding entries matching the keyword (or string) in an index created from parsing the information items into searchable words and the location in which the word appears in the database. For example, the Internet, or the world wide web (WWW) may be considered as a very large database of information items, in the form of web pages, distributed over a very wide network. Currently available search engines, e.g., the YAHOO™, EXCITE™, and the like, maintain an index of the entire content of the WWW parsed into searchable words and corresponding locations, e.g., the Uniform Resource Locators (URL).

At the conclusion of a search, all matching entries are returned to the user who selects therefrom the one particularly desired information item. Often, however, as the size of a database becomes very large (e.g., the number of web pages in the WWW is currently in the hundreds of millions, and growing fast), a search may return more matching entries than a typical user can ever review in a reasonable time. Thus, even if the search was effective in finding every matching entry, a user must still sift through an excessive number of returned entry to find the one desired information item. This problem—referred to as the "information overload" problem—diminishes the usefulness of the database.

Conventional search mechanisms, e.g., a web search engine, attempt to address the above information overload problem by presenting the matching entries in a more useful form thereby making it easier for the user to select therefrom. To this end, typically, each of the matching entries is ranked in terms of its relevance or usefulness. The matching entries are sorted according to, and presented to the user in the order of, the usefulness ranking. Thus, the user is first presented with information items that are purported to be the most useful and relevant. Obviously, the usefulness of the above relevancy rating would be largely dependent on how accurately the ratings can be made.

Conventional methods of relevancy rating rely on explicit feedback from users of the information items, i.e., by requesting the user to explicitly answer at least one question regarding the usefulness or the relevance of the retrieved information. For example, a user may be asked to answer either "yes" or "no" to a question "Was the information helpful?". Alternately, the user may be asked, e.g., to choose from "very useful", "somewhat useful", "not useful", and the like. Thus, the accuracy of conventional relevancy ratings depends largely on the explicit inputs from the users of the information items.

Unfortunately, in practice, only a small number (e.g., less than 10 percent) of users even bother to respond to the rating requests, and conventional relevancy ratings are thus often not accurate predictions of the usefulness or the relevance of an information item. Accordingly, in a conventional informational database search, the order in which the retrieved information items are sorted and presented to the user is often nonsensical, and still requires the user to sift through an excessive number of items, and thus fails to effectively address the information overload problem.

Moreover, usefulness or relevance of an informational item may change over time as, for example, the information contained within the item may become outdated. However, once a relatively high relevancy rating is attributed to an informational item, the rated informational item may continue to appear in the earlier portion of the search result presented to the user. That is, a conventional rating method biases the database system to present retrieved information items in the order of a high overall historical rating, but without regard to the datedness of informational items or temporal preference.

Thus, what is needed is an efficient system for and method of rating the usefulness or the relevance of a retrieved informational item without requiring an explicit user feedback.

What is also needed is an efficient system and method for determining a temporally accurate usefulness or relevance rating of a retrieved informational item.

SUMMARY OF INVENTION

In accordance with the principles of the present invention, a method of, and an apparatus for, implicitly assigning relevancy ratings of a plurality of informational items in an information retrieval system comprises the steps, and means for, detecting an initial user selection of a selected subset of the plurality of informational items, adjusting a relevancy rating of the selected subset of the plurality of informational items in light of the detected initial user selection and based upon a pattern of behavior of a set of users with respect to the informational items, and storing the adjusted relevancy rating for the selected subset of the plurality of informational items.

In addition, in accordance with the principles of the present invention, an information retrieval system comprises a plurality of informational items, an adjustment means adapted to adjust a relevancy rating of a selected subset of the plurality of informational items upon a detection of an initial user selection of the selected subset of the plurality of informational items and based upon a pattern of behavior of a set of users with respect to the informational items, and an index for storing the adjusted relevancy rating.

Also, in accordance with the principles of the present invention, a computer program stored on a computer readable storage medium implements a method of implicitly assigning relevancy ratings of a plurality of informational items in an information retrieval system, and comprises a set of instructions for detecting an initial user selection of a selected subset of the plurality of informational items, adjusting a relevancy rating of the selected subset of the plurality of informational items in light of the detected initial user selection and based upon a pattern of behavior of a set of users with respect to the informational items, and storing the adjusted relevancy rating for the selected subset of the plurality of informational items.

DESCRIPTION OF DRAWINGS

Features and advantages of the present invention will become apparent to those skilled in the art from the following description with reference to the drawings, in which:

FIG. 2 is an exemplary table showing the relevant portions of the index shown in FIG. 1;

DETAILED DESCRIPTION OF PREFERRED EMBODIMENTS

For simplicity and illustrative purposes, the principles of the present invention are described by referring mainly to an exemplar embodiment, particularly, with references to the Internet and the world wide web (WWW) as the exemplary databases of informational items. However, one of ordinary skill in the art would readily recognize that the same principles are equally applicable to, and can be implemented in, other informational database, and that any such variation would be within such modifications that do not depart from the true spirit and scope of the present invention.

In accordance with the principles of the present invention, an information retrieval system allows a user to search a database of informational items for a desired informational item, and presents the search result in the form of matching index entries in the order of relevance. The information retrieval system in accordance with the principles of the present invention assigns a relevance rating to each of the index entries without requiring an explicit input from the user with respect to the usefulness or the relevance of the retrieved information corresponding to the respective index entries. When the user selects and retrieves an informational item through a list of index entries presented by the retrieval system as a result of a search, the relevance rating of the selected informational item is increased by a predetermined amount.

The relevance rating of the selected informational item is further adjusted based on any actions the user takes subsequent to the initial selection of the informational item if the subsequent act indicates that the relevance of the selected informational item may be less than what is reflected by the rating increase by the predetermined amount. Ratings of the informational items in the database are determined from implicit suggestions from the usage of the retrieval system and the database by the user rather than from an explicit user input.

In another aspect of the present invention, the ratings are allowed to decay over time to minimize the tendencies for historical usage biased rating, and to provide more temporally accurate ratings. The most recently accessed time of each of the informational items in the database is compared to a predetermined stale access time threshold, and if the most recently accessed time is older than the threshold, than the rating of the corresponding informational item is decreased by a predetermined amount to reflect the dated nature of the information contained within the item.

Figure 1:
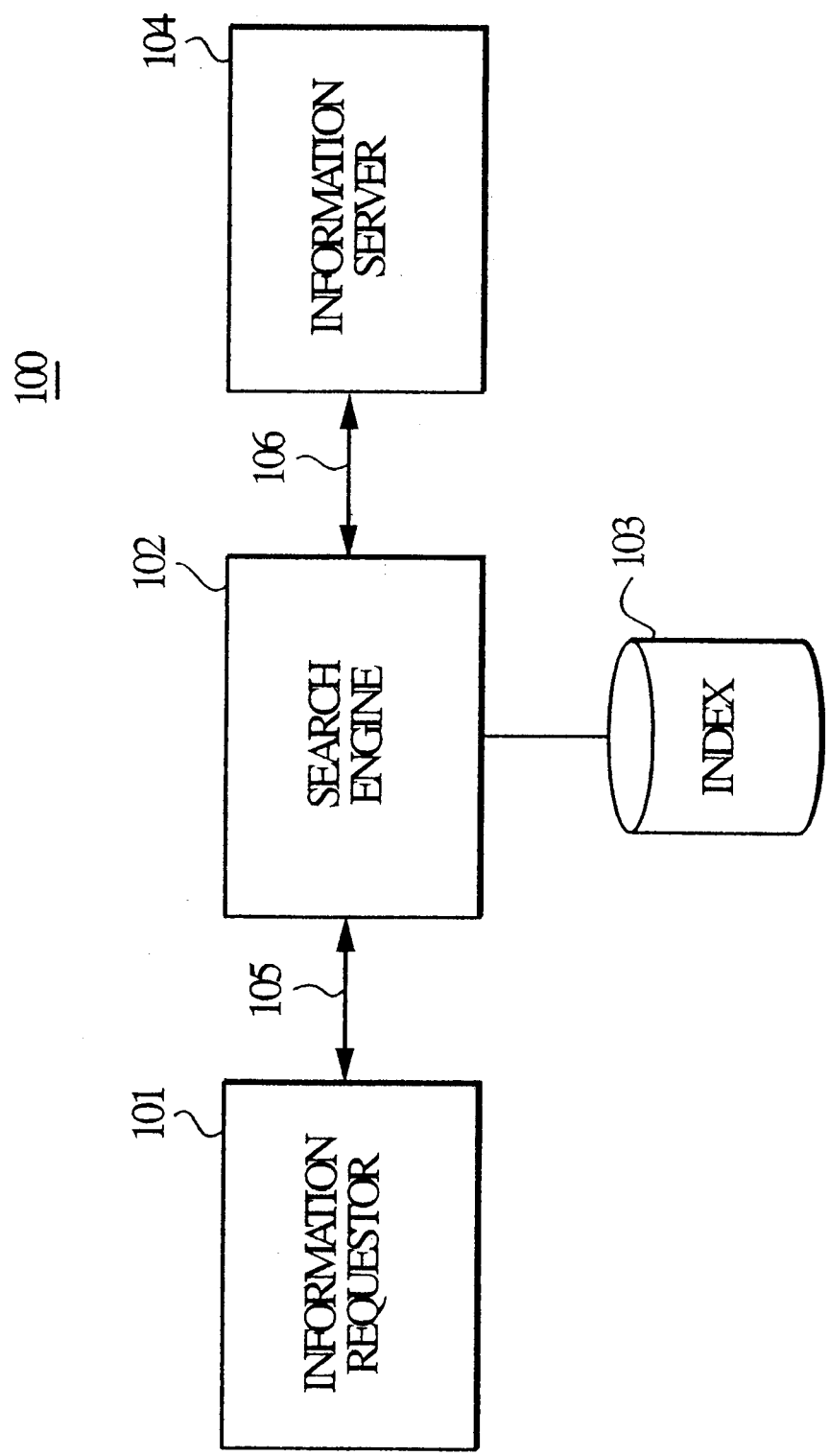
FIG. 1 is an exemplary block diagram of the information retrieval system in accordance with the principles of the present invention.

In particular, FIG. 1 shows an illustrative embodiment of the information retrieval system 100 in accordance with the principles of the present invention, which may comprise, in relevant part, inter alia, an information requester 101, a search engine 102 and an information server 104. The information retrieval system 100 may be any system in which a plurality of informational items are available to be searched and retrieved. For example, the entire information retrieval system 100 may be housed within a single computer system, where the information server 104 may comprise a database containing a plurality of informational items stored in a mass storage device, e.g., a hard disk or the like, and where the information requester 101 may be a user interface through which a user may initiate a search and retrieval session with the search engine 102, which in turn may be an application program running on the computer. In this example, the communication interfaces 105 and 106 may be, e.g., bus(s) within the computer system.

Alternately, the information retrieval system 100 may even comprise a single computer program, in which each of the information server 104, information requester 101 and the search engine 102 may comprise a sub-component of the single computer program. In this case, communications interfaces 105 and 106 may themselves be computer routines acting as, e.g., program interfaces.

In a yet another alternative embodiment, the information retrieval system 100 may comprise a plurality of computers connected via a computer network. For example, the communication interfaces 105 and 106 may be a wide area network (WAN), e.g., the Internet, the world wide web (WWW), Public Switched Telephone Network (PSTN), or the like, through which each of the information requester 101, the search engine 102 and the information server 104 communicate. The information requester 101 may be, e.g., a personal computer connected to the Internet, e.g., via a modem or the like. The information server 104 may comprise a plurality of computers, e.g., web servers, distributed over the WAN 105, 106, e.g., the Internet. The search engine 102 may comprise any currently available and known search engines, e.g., the YAHOO™, EXCITE™, and the like, and may maintain an index 103 of the entire content of the WWW parsed into searchable words and corresponding locations as shown in FIG. 2. An example of a known search engine may also be found from, e.g., U.S. Pat. No. 6,02,409 issued Feb. 1, 2000 to Michael Burrows, the entirety of which is hereby incorporated by reference herein.

FIG. 2 shows the relevant portions 200 of the index 103. The index 103 in accordance with the principles of the present invention comprises, inter alia, an information item field 201 that uniquely identifies an information items, e.g., INFO#1 to INFO#n, a location Field (LOC) 202 containing the location pointers, e.g., the URL in the case of WWW pages, for the information items, a relevancy rating ($R_R$) field 203 contains the relevancy rating of the information items that indicates the relative usefulness of each of the informational items as related to each other, and a most recent access time ($t_{MRA}$) field 204 that contains the time stamp of the last time the respective informational item was accessed. The search engine 102 may periodically monitor the information server 104 via the communication interface 106 for any newly added informational items to be added the index 103.

In operation, when the information requester 101 requires an informational item, it initiates an information retrieval session by sending a search request to the search engine 102 via the communication interface 105. For example, the search request may be generated when a user of a client computer in a WAN, e.g., the Internet, enters a keyword WORD1 in the keyword entry field 302 of a user interface search screen 301 shown in FIG. 3A, and "clicks" on the search button 303. Upon receiving the search request, the search engine searches the index 103 for all entries that contain the keyword WORD1 in the index term field 201. The search engine 102 returns, via the communication interface 105, all matching entries to be displayed to the information requester 101.

Figure 3:
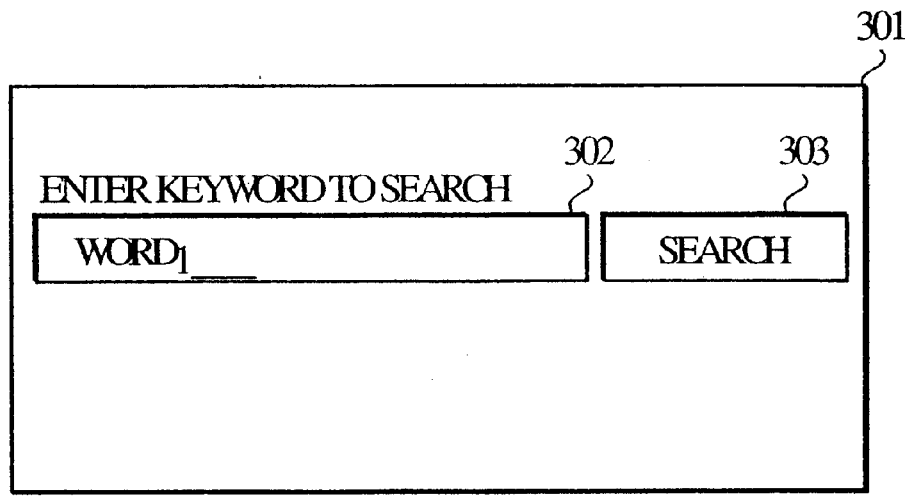
FIG. 3A shows an exemplary embodiment of the user interface search screen in accordance with the principles of the present invention.
FIG. 3B shows an exemplary embodiment of the user interface search result screen in accordance with the principles of the present invention.
Figure 3:
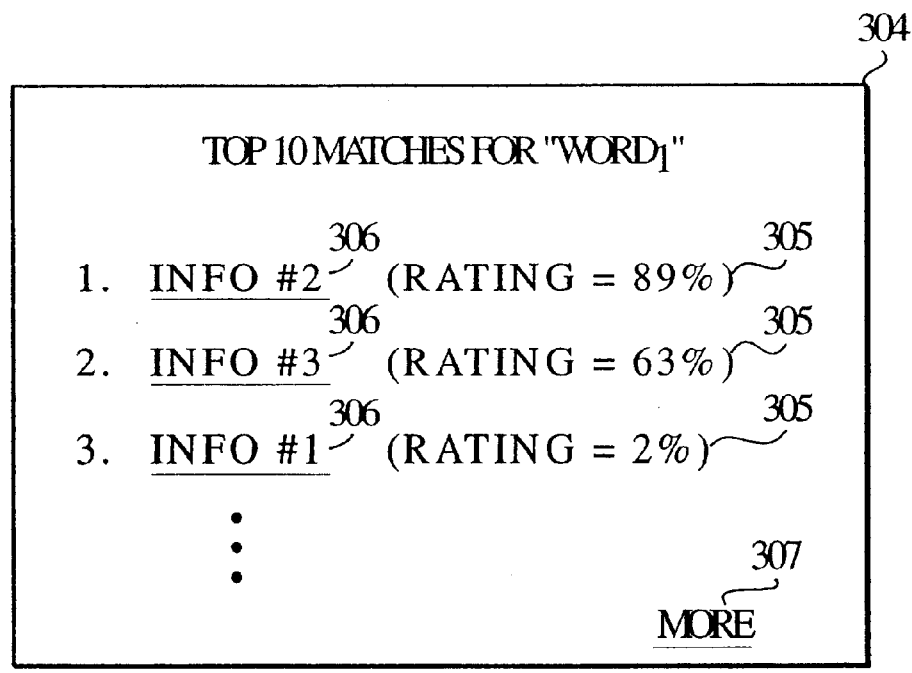

FIG. 3B shows an exemplary display format 304 of the returned matching entries. As shown, identifications 306 of, e.g., first few words or sentences, preferably with hyperlinks to, the matching informational items are displayed in the descending order of their respective informational importance 305. The informational importance is determined based on a combination of the degree that the search term WORD1 302 matched the information item and the relevancy rating 203 of that information item. The information requester 101 may request more matching entries in addition to the ones shown in the initial display screen by clicking on the "more" button 307.

Figure 4:
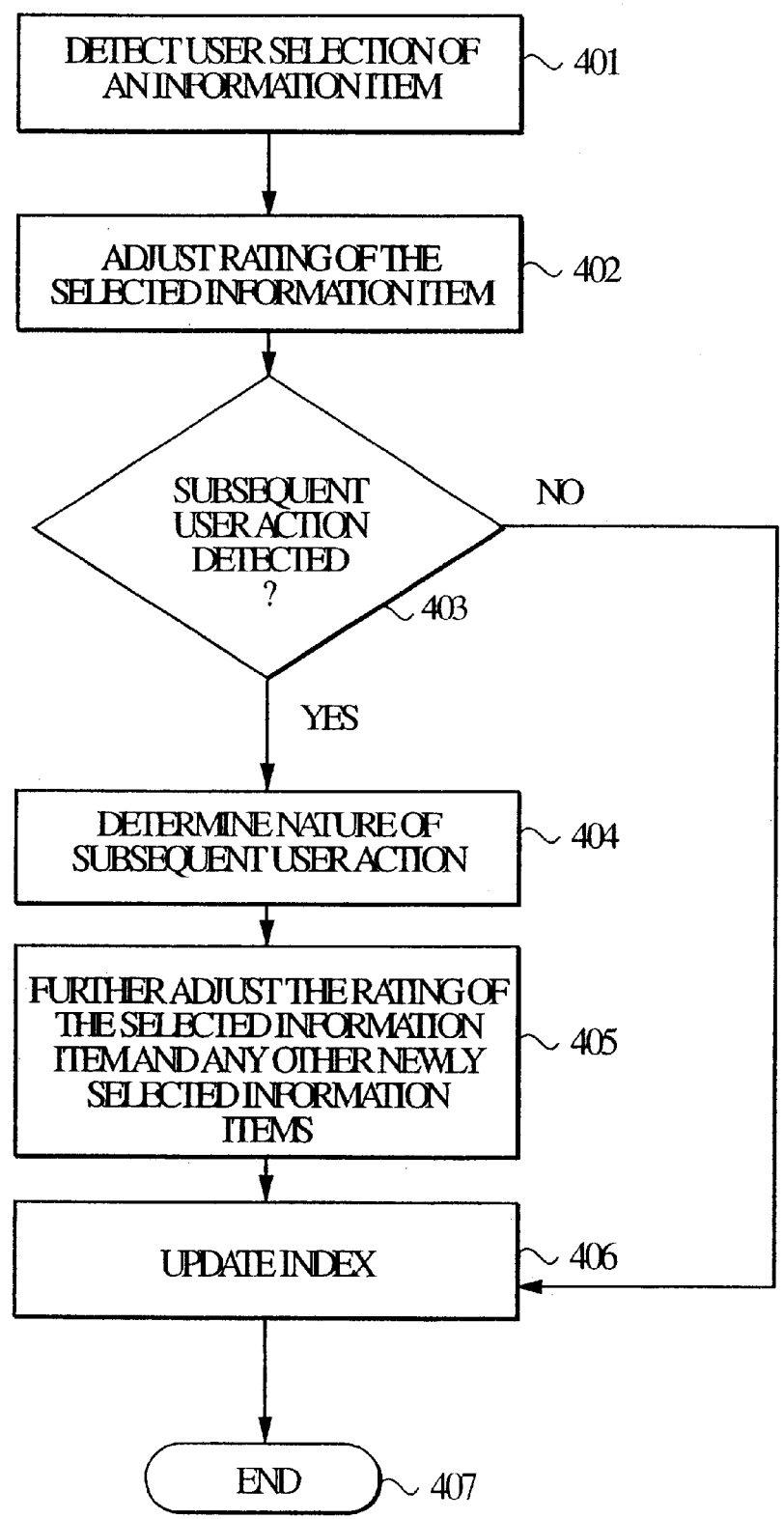
FIG. 4 is a flow diagram showing an exemplary embodiment of the relevance rating method in accordance with the principles of the present invention.

FIG. 4 shows an exemplary embodiment of the relevancy rating method in accordance of the principles of the present invention. In step 401, the present inventive information retrieval system 100 detects a selection, from the above described matching entry display screen, of an information item by the user, e.g., the INFO#1 306 having a present relevancy rating of R1. When the user selects an information item, e.g., by clicking on the provided hyperlink, a retrieval request is sent to the search engine 102 via the communication interface 105. Upon receiving the retrieval request, the information retrieval system 100 adjusts the rating of the selected information item. For example, a positive user feedback is assumed from the fact that the user made the selection, and thus the relevancy rating for the selected information item may be increased by a predetermined amount (RATE#1), e.g., two (2). The predetermined amount of increase represents the weight of the user selection to be attributed with respect to relevancy rating, and can be determined (and adjusted time to time) empirically by the search engine 102 from observing the performance behavior of the information retrieval system 100, or in the alternative, may be specified by the information requester 101 during the information retrieval session.

In step 403, a determination is made whether the user has taken an action subsequent to the initial selection detected during the step 401. If the user has not taken any action subsequent to the initial selection, then it is assumed that the initial adjustment of the relevancy rating (made in step 402) is correct, and the process flow proceeds to step 406 during which the adjusted relevancy rating is stored to update the index 103.

If, on the other hand, a subsequent action by the user is detected by the search engine 102 (e.g., when a request signal is received from the information requester 101 via the communication interface 105), the search engine 102 examines, in step 404, the request signal to determine the nature of the subsequent user action. From the nature of the subsequent user action, one can draw reasonable conclusions with regard to the relevancy and/or usefulness of the selected informational item.

It is assumed that by initial selection of an informational item, the user is providing positive feedback about that selected informational item. However, if the user subsequently selects additional informational items, submits a question, searches for additional informational items, and/or initiates a entirely new search, it can be concluded that the usefulness of the initially selected informational item may be less than originally assumed. Accordingly, The relevancy rating of the initially selected informational item may be adjusted downward by a second predetermined amount, RATE#2, in light of any of the above subsequent user action.

Finally, in step 406, the adjusted relevancy ratings of selected informational items are stored to update the index 103.

The following examples are provided to further illustrate the operation of the inventive relevancy rating method of FIG. 4. Assume, for example, that three adjustment factors, RATE#1, RATE#2 and RATE#3 are provided, where RATE#1>RATE#2 and RATE#1>RATE#3.

EXAMPLE 1

In step 401, when a user selection of an informational item, e.g., INFO#1 having a current relevancy rating of R1 (FIG. 3B), is detected, in step 402, the relevancy rating of INFO#1 is increased by RATE#1, e.g., two (2), to arrive at the adjusted relevancy rating of 38 for INFO#1. If the user takes no other action, the adjusted relevancy rating, i.e., 38, is stored in the index 103 in step 406. However, when retrieval request for INFO#2 is subsequently received (steps 404 and 405), the relevancy rating of INFO#1 is further adjusted, i.e., decreased by RATE#2, e.g., one (1), to arrive a a further adjusted relevancy rating for INFO#1, i.e., 37. Thus, the final relevancy rating used to update the index 103 is 37.

The relevancy rating of the subsequently selected informational item, INFO#2, may be increased by RATE#1, to arrive at an adjusted relevancy rating for INFO#2, e.g., 77.

If the user continues on to select another informational item, e.g., INFO#3, the relevancy rating of INFO#3 is increased by RATE1 while the relevancy rating of INFO#2 is decreased by RATE#2. The relevancy rating of INFO#1 would remain unchanged at +RATE#1 −RATE#2, i.e., 37.

EXAMPLE 2

In step 401, when a user selection of an informational item, e.g., INFO#1, is detected, the relevancy rating of INFO#1 is increased by RATE#1 in step 402, to arrive at an adjusted relevancy rating for INFO#1. If the user takes no other action, the adjusted relevancy rating is stored in the index 103 in step 406.

However, when the information requester 101 subsequently submits, via the communication interface 105, a question with respect to the informational item being sought, the relevancy rating of INFO#1 is further adjusted, i.e., decreased by RATE#2, and the resulting adjusted relevancy rating is stored in the index 103, since the information item INFO#1 did not end the search.

EXAMPLE 3

In step 401, when a user selection of an informational item, e.g., INFO#1, is detected, the relevancy rating of INFO#1 is increased by RATE#1 in step 402, to arrive at the adjusted relevancy rating for INFO#1. If the user takes no other action, the adjusted relevancy rating is stored in the index 103 in step 406.

However, when the information requester subsequently initiates an additional search, e.g., send a search request over the communication interface 105, and if newly matched informational items, INFO#2 and INFO#3 were found as a result of the new search, the relevancy rating of INFO#1 is further adjusted, i.e., decreased by RATE#2. The relevancy ratings of both INFO#2 and INFO#3 are increased by RATE#3. The respective adjusted relevancy ratings are stored to update the index 103.

EXAMPLE 4

In this example, the inventive relevancy ranking method is utilized in presenting an ordered list of frequently asked questions (FAQs) on the World Wide Web, e.g., from a customer service web site. For simplicity, the initial relevancy ratings associated with each respective FAQ item in the service web site is assumed to have an initial value of zero (0). However, it should be readily apparent to one skilled in the art that the initial values of the relevancy ratings do not have to be initialized to zero, but are merely being assumed to provide an easier understanding of this example.

When a customer first visits the service web site, the customer is presented with a sorted list of FAQ titles. When the customer selects one of the FAQ titles to view in detail the respective FAQ item associated thereto, e.g., (FAQ#1), the relevancy rating associated with this selected FAQ item is increased by RATE#1 (e.g., 2 points), resulting in the new relevancy rating value of two (2). If this FAQ item satisfactorily answered the customer's question, the customer may choose to end the session at this point. However, if the customer continues on, e.g., by returning to the list of sorted FAQ titles, and selecting a second FAQ title to view the associated FAQ item (e.g., FAQ#2) in detail, the relevancy rating associated with the FAQ#2 is increased by RATE#1 (e.g., 2 points), while the relevancy rating associated with the FAQ#1 is decreased by RATE#2 (e.g., 1 point). The relevancy ratings of the FAQ items, FAQ#1 and FAQ#2, are now 1 and 2, respectively.

When, e.g., the customer once again returns to the sorted list of FAQ titles, and chooses yet a third FAQ title to view in detail the associated third FAQ item (FAQ#3). The relevancy rating for this FAQ#3 is increased by RATE#1 (e.g., 2 points), the relevancy rating for the secondly selected FAQ item (FAQ#2) is decreased by RATE#2 (e.g., 1 point), and the relevancy rating for the firstly selected FAQ item (FAQ#1) is not updated further. After this selection the resulting relevancy ratings are 1, 1, and 2 for the FAQ#1, FAQ#2, and FAQ#3, respectively.

Now, assume further that the customer was still unable to have the question answered satisfactorily. At this point the customer may enter a search query in an attempt to find an answer to the question. Assume the search returns three FAQ items, FAQ#4, FAQ#5, and FAQ#6. For all those FAQ items that successfully matched the query and thus are returned for the customer's selection, the respective associated relevancy rating for each matching FAQ item is increased by RATE#3 (e.g., 1 point), while the relevancy rating for the thirdly selected FAQ item (FAQ#3) is decremented by 1 point (RATE#2).

The resulting relevancy ratings for each of FAQ#1, FAQ#2, FAQ#3, FAQ#4, FAQ#5 and FAQ#6 are now all set at 1. At this point the customer decides one of the returned FAQ items (FAQ#4, FAQ#5 and FAQ#6), may contain the answer for the question, and selects to view the details of a fourth FAQ item (FAQ#4). The relevancy rating for this FAQ (FAQ#4) is increased by RATE#1 (e.g., 2 points). Since the previously viewed FAQ, e.g., the thirdly selected FAQ item (FAQ#3), has already been decremented by I point (RATE#2) during the search request, the relevancy rating is not further adjusted. The counter for the latest selected FAQ item (FAQ#4) is now set to 3, while relevancy ratings for the other FAQ items, i.e., FAQ#1, FAQ#2, FAQ#3, FAQ#5 and FAQ#6, remain at 1.

At this point the customer may decide that it is time to stop trying to find the answer from among the existing FAQ items, and instead ask his question directly to a customer service representative via a Web form, e.g., an e-mail. Upon submission, the last FAQ item that the customer viewed (FAQ#4) is decremented by 1 (RATE#2) to the final count of 2, and relevancy ratings for the other FAQ items involved during the session, i.e., FAQ#1, FAQ#2, FAQ#3, FAQ#5 and FAQ#6, remain unchanged at 1 point.

Thus, at the end of the customer's session, the relevancy ratings for the FAQ items with which the customer interacted would have experienced the following manipulations:

FAQ#1: initial value+RATE#1−RATE#2=0+2−1=1;

FAQ#2: initial value+RATE#1−RATE#2=0+2−1=1;

FAQ#3: initial value+RATE#1−RATE#2=0+2−1=1;

FAQ#4: initial value+RATE#3+RATE#1−RATE#2=0+1+2−1=2;

FAQ#5: initial value+RATE#3=0+1=1; and

FAQ#6: initial value+RATE#3=0+1=1.

As can be appreciated, the inventive relevancy rating system described above determines the relevancy rating of informational items, without requiring an explicit rating by a user, by providing a weighted adjustments of the ratings based on the usage of the informational items by the users. The inventive relevancy rating system can be used to augment conventionally known rating systems, or could supplant conventional explicit rating methods when the conventional method is unavailable and/or in appropriate.

In another aspect of the present invention, the relevancy ratings are allowed to decay over time to minimize the tendencies for historical usage biased rating, and to provide a more temporally accurate ratings. The most recently accessed time of each of the informational items in the database is compared to a predetermined stale access time threshold, and if the most recently accessed time is older than the threshold, then the rating of the corresponding informational item is decreased to reflect the dated nature.

Figure 5:
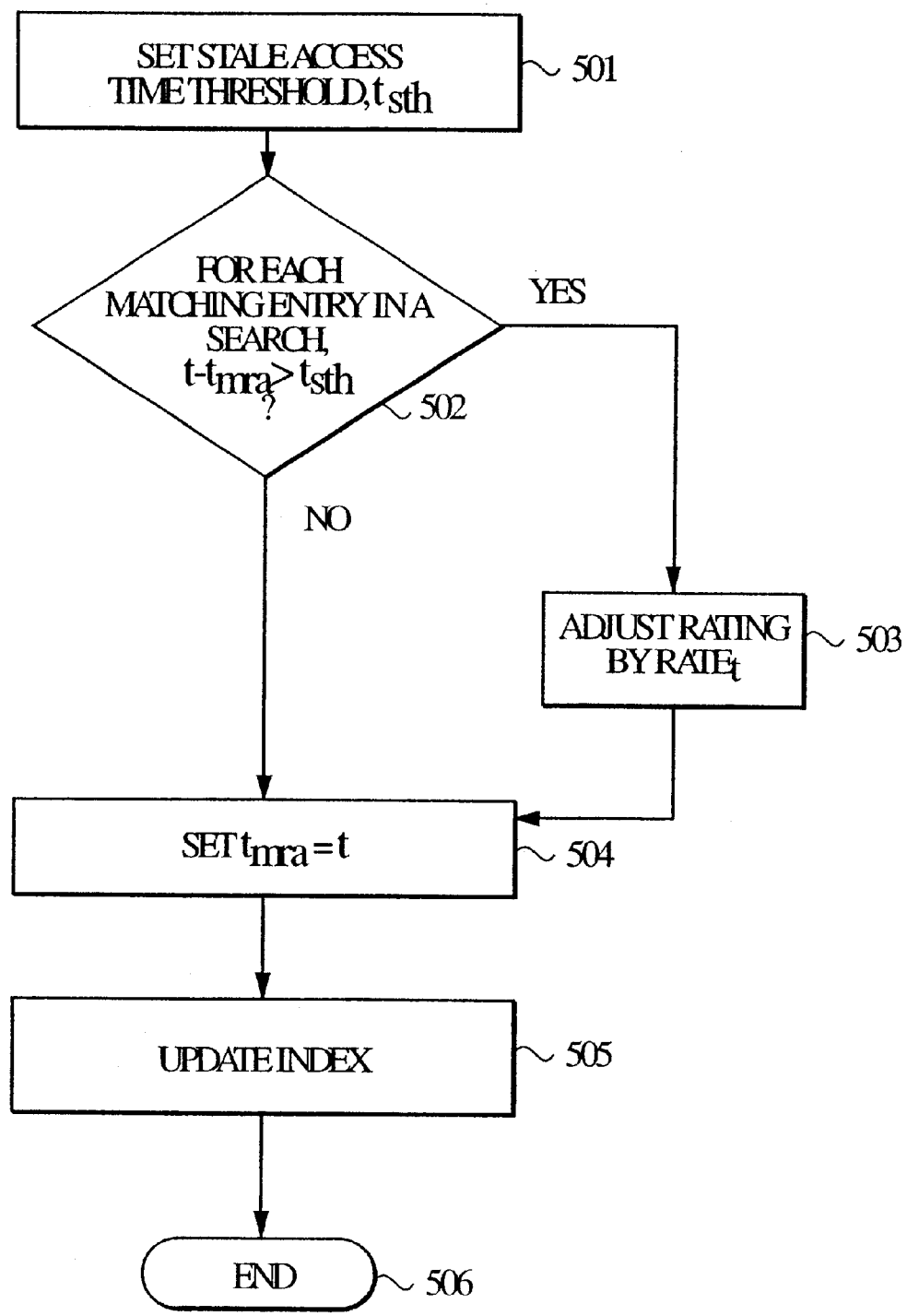
FIG. 5 is a flow diagram showing an exemplary embodiment of the temporally accurate relevance rating method in accordance with the principles of the present invention.

In particular, FIG. 5 shows an illustrative embodiment of the temporal adjustment for the relevancy ratings. According to this embodiment, in step 501, a stale access time threshold value ($t_{sth}$) is determined. The $t_{sth}$ represents a predetermined length of time duration between consecutive accesses of an informational item. Expiration of the $t_{sth}$ requires an adjustment of the relevancy rating of that informational item.

In step 502, for each of the matching entries of the index 103 after a search, a determination whether the elapsed time since the last time of access of the respective informational item, i.e., the current time t minus $t_{MRA}$ 204 ($t-t_{MRA}$), exceeds the $t_{sth}$. If the threshold is exceeded, it is assumed that, for the purpose of relevancy rating, that the information is stale, and thus the relevancy rating of the informational item is adjusted (or "aged") by a predetermined temporal adjustment factor $RATE_t$ in step 503. If on the other hand, in a preferred embodiment of the present invention, the threshold has not been exceeded, then, in step 504, the $T_{MRA}$ 204 of the informational item is preferably set to equal the current time to avoid excessive aging of an information item.

Finally, in step 505, the index 103 is updated to reflect any changes to the relevancy rating and/or the $T_{MRA}$ 204.

Both the stale access time threshold value ($t_{sth}$) and the temporal adjustment factor $RATE_t$ can be chosen based on the desired temporal sensitivity of the relevancy ratings. For example, the threshold value may be set to be an arbitrarily large time duration, e.g., 1000 years, for the minimal temporal sensitivity. The threshold value may, on the other hand, be set to a much smaller time duration, e.g., one day or even one hour, for maximum temporal sensitivity, and to place a strong bias for those informational items that have been recently accessed. Similarly, e.g., setting the $RATE_t$ to 100 percent will effectively erase all historical ratings older than the specified $t_{sth}$. Setting the $RATE_t$ to zero percent will result in the minimal temporal sensitivity of the relevancy ratings, i.e., no ratings being aged. The threshold value and the adjustment factor may be determined empirically to tune the information retrieval system for optimal performance, and may be set by the system administrator of the retrieval system, or in the alternative, the user, i.e., the information requestor 101, may be allowed to specify per search request basis, e.g., providing an input capability for the respective values in the search screen shown in FIG. 3A.

As can be appreciated, the inventive relevancy rating aging system described above, allows the rating to decay over time to minimize the tendencies for historical usage biased rating, and to provide a more temporally accurate ratings.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of implicitly assigned relevancy ratings of a plurality of informational items in an information retrieval system, comprising:
   detecting an initial user selection of a selected subset of said plurality of informational items;
   adjusting a relevancy rating of said selected subset of said plurality of informational items in light of said detected initial user selection and based upon a pattern of behavior of a set of users without requiring an explicit input from the users with respect to characteristics of said informational items; and
   storing said adjusted relevancy rating for said selected subset of said plurality of information items.

2. The method of implicitly assigning relevancy ratings in accordance with claim 1, wherein said step of adjusting said relevancy rating comprises:
   increasing said relevancy rating of said selected subset of said plurality of informational items by a first predetermined amount.

3. The computer readable storage medium in according to claim 1, wherein:
   said instructions for adjusting said relevancy rating are adapted to increase said relevancy rating of said selected subset of said plurality of informational items by a first predetermined amount.

4. A method of implicitly assigning relevancy ratings of a plurality of informational items in an information retrieval system, comprising:
   detecting an initial user selection of a selected subset of said plurality of informational items;
   adjusting a relevancy rating of said selected subset of said plurality of informational items in light of said detected initial user selection;
   storing said adjusted relevancy rating for said selected subset of said plurality of informational items;
   detecting a user action subsequent to said detected initial user selection;
   determining a nature of said user action; and
   further adjusting said relevancy rating of said selected subset of said plurality of informational items based on said detected nature of said user action,
   wherein said step of determining said nature of said user action comprises:
      detecting a user selection of a second selected subset of said plurality of informational items; and
      wherein said step of further adjusting said relevancy rating comprises:
         decreasing said adjusted relevancy rating of said first selected subset of said plurality of informational items by a second predetermined amount, said second predetermined amount being smaller than said first predetermined amount.

5. The method of implicitly assigning relevancy ratings in accordance with claim 4, further comprising:
   increasing a relevancy rating of said second selected subset of said plurality of informational items by said first predetermined amount.

6. The method of implicitly assigning relevancy ratings in accordance with claim 5, further comprising:
   detecting a user selection of a third selected subset of said plurality of informational items;
   decreasing said relevancy rating of said second selected subset of said plurality of informational items by said second predetermined amount; and
   increasing a relevancy rating of said third selected subset of said plurality of informational items by said first predetermined amount.

7. A method of implicitly assigning relevancy ratings of a plurality of informational items in an information retrieval system, comprising:
   detecting an initial user selection of a selected subset of said plurality of informational items;
   adjusting a relevancy rating of said selected subset of said plurality of informational items in light of said detected initial user selection;
   storing said adjusted relevancy rating for said selected subset of said plurality of informational items;
   detecting a user action subsequent to said detected initial user selection;
   determining a nature of said user action; and
   further adjusting said relevancy rating of said selected subset of said plurality of informational items based on said detected nature of said user action,
   wherein said step of determining said nature of said user action comprises:
      detecting a user submission of a question; and
      wherein said step of further adjusting said relevancy rating comprises:

decreasing said adjusted relevancy rating of said selected subset of said plurality of informational items by a second predetermined amount, said second predetermined amount being smaller than a first predetermined amount.

8. A method of implicitly assigning relevancy ratings of a plurality of informational items in an information retrieval system, comprising:

detecting an initial user selection of a selected subset of said plurality of informational items;

adjusting a relevancy rating of said selected subset of said plurality of informational items in light of said detected initial user selection;

storing said adjusted relevancy rating for said selected subset of said plurality of informational items;

detecting a user action subsequent to said detected initial user selection;

determining a nature of said user action; and further adjusting said relevancy rating of said selected subset of said plurality of informational items based on said detected nature of said user action, wherein said step of determining said nature of said user action comprises:

detecting a user initiation of a new search; and wherein said step of further adjusting said relevancy rating comprises:

decreasing said adjusted relevancy rating of said selected subset of said plurality of informational items by a second predetermined amount, said second predetermined amount being smaller than a first predetermined amount.

9. The method of implicitly assigning relevancy ratings in accordance with claim 8, further comprising:

increasing a relevancy rating of a fourth selected subset of said plurality of informational items by a third predetermined amount, said fourth selected subset of said plurality of informational items being found as a result of said new search, and said third predetermined amount being smaller than said first predetermined amount.

10. An apparatus for implicitly assigning relevancy of ratings of a plurality of informational items in an information retrieval system, comprising:

means for detecting an initial user selection of a selected subset of said plurality of informational items;

means for adjusting a relevancy rating of said selected subset of said plurality of informational items in light of said detected initial user selection and based upon a pattern of behavior of a set of users without requiring an explicit input from the users with respect to characteristics of said informational items; and means for storing said adjusted relevancy rating for said selected subset of said plurality of informational items.

11. The apparatus for implicitly assigning relevancy ratings according to claim 10, wherein:

said means for adjusting said relevancy rating is adapted to increase said relevancy rating of said selected subset of said plurality of informational items by a first predetermined amount.

12. An apparatus for implicitly assigning relevancy ratings of a plurality of informational items in an information retrieval system, comprising:

means for detecting an initial user selection of a selected subset of said plurality of informational items;

means for adjusting a relevancy rating of said selected subset of said plurality of informational items in light of said detected initial user selection;

means for storing said adjusted relevancy rating for said selected subset of said plurality of informational items;

means for detecting a user action subsequent to said detected initial user selection;

means for determining a nature of said user action; and means for further adjusting said relevancy rating of said selected subset of said plurality of informational items based on said detected nature of said user action, wherein:

said means for determining said nature of said user action is adapted to detect a user selection of a second selected subset of said plurality of informational items; and wherein said means for further adjusting said relevancy rating is adapted to decrease said adjusted relevancy rating of said first selected subset of said plurality of informational items by a second predetermined amount, said second predetermined amount being smaller than a first predetermined amount.

13. The apparatus for implicitly assigning relevancy ratings according to claim 12, further comprising:

means for increasing a relevancy rating of said second selected subset of said plurality of informational items by said first predetermined amount.

14. The apparatus for implicitly assigning relevancy ratings according to claim 13, further comprising:

means for detecting a user selection of a third selected subset of said plurality of informational items;

means for decreasing said relevancy rating of said second selected subset of said plurality of informational items by said second predetermined amount; and means for increasing a relevancy rating of said third selected subset of said plurality of informational items by said first predetermined amount.

15. An apparatus for implicitly assigning relevancy ratings of a plurality of informational items in an information retrieval system, comprising:

means for detecting an initial user selection of a selected subset of said plurality of informational items;

means for adjusting a relevancy rating of said selected subset of said plurality of informational items in light of said detected initial user selection;

means for storing said adjusted relevancy rating for said selected subset of said plurality of informational items;

means for detecting a user action subsequent to said detected initial user selection;

means for determining a nature of said user action; and means for further adjusting said relevancy rating of said selected subset of said plurality of informational items based on said detected nature of said user action, wherein:

said means for determining said nature of said user action is adapted to detect a user submission of a question; and wherein said means for further adjusting said relevancy rating is adapted to decrease said adjusted relevancy rating of said selected subset of said plurality of informational items by a second predetermined amount, said second predetermined amount being smaller than a first predetermined amount.

16. An apparatus for implicitly assigning relevancy ratings of a plurality of informational items in an information retrieval system, comprising:

means for detecting an initial user selection of a selected subset of said plurality of informational items;

means for adjusting a relevancy rating of said selected subset of said plurality of informational items in light of said detected initial user selection;

means for storing said adjusted relevancy rating for said selected subset of said plurality of informational items;

means for detecting a user action subsequent to said detected initial user selection;

means for determining a nature of said user action; and means for further adjusting said relevancy rating of said selected subset of said plurality of informational items based on said detected nature of said user action, wherein:

said means for determining said nature of said user action is adapted to detect a user initiation of a new search; and wherein said means for further adjusting said relevancy rating is adapted to decrease said adjusted relevancy rating of said selected first subset of said plurality of informational items by a second predetermined amount, said second predetermined amount being smaller than a first predetermined amount.

17. The apparatus for implicitly assigning relevancy ratings according to claim 16, further comprising:

means for increasing a relevancy rating of a fourth selected subset of said plurality of informational items by a third predetermined amount, said fourth selected subset of said plurality of informational items being found as a result of said new search, and said third predetermined amount being smaller than said first predetermined amount.

18. An information retrieval system, comprising:

a plurality of information items;

an adjustment means adapted to adjust a relevancy rating of a selected subset of said plurality of information items upon a detection of an initial user selection of said selected subset of said plurality of informational items and based upon a pattern of behavior of a set of users without requiring an explicit input from the users with respect to characteristics of said informational items; and an index for storing said adjusted relevancy rating.

19. The information retrieval system according to claim 18, wherein said plurality of informational items comprise:

a plurality of world wide web pages.

20. A computer readable storage medium having stored thereon computer program for implementing a method of implicitly assigning relevancy ratings of a plurality of informational items in an information retrieval system, said computer program comprising a set of instructions for:

detecting an initial user selection of a selected subset of said plurality of informational items;

adjusting a relevancy rating of said selected subset of said plurality of informational items in light of said detected initial user selection and based upon a pattern of behavior of a set of users without requiring an explicit input from the users with respect to characteristics of said informational items; and storing said adjusted relevancy rating for said selected subset of said plurality of information items.

21. A computer readable storage medium having stored thereon computer program for implementing a method of implicitly assigning relevancy ratings of a plurality of informational items in an information retrieval system, said computer program comprising a set of instructions for:

detecting an initial user selection of a selected subset of said plurality of informational items;

adjusting a relevancy rating of said selected subset of said plurality of informational items in light of said detected initial user selection;

storing said adjusted relevancy rating for said selected subset of said plurality of informational items;

detecting a user action subsequent to said detected initial user selection;

determining a nature of said user action; and further adjusting said relevancy rating of said selected subset of said plurality of informational items based on said detected nature of said user action, wherein:

said one or more instructions for determining said nature of said user action are adapted to detect a user selection of a second one of said plurality of informational items; and wherein said one or more instructions for further adjusting said relevancy rating are adapted to decrease said adjusted relevancy rating of said selected subset of said plurality of informational items by a second predetermined amount, said second predetermined amount being smaller than a first predetermined amount.

22. The computer readable storage medium in according to claim 21, wherein said computer program further comprising one or more instructions for:

increasing a relevancy rating of said second selected subset of said plurality of informational items by said first predetermined amount.

23. The computer readable storage medium in according to claim 22, wherein said computer program further comprising one or more instructions for:

detecting a user selection of a third selected subset of said plurality of informational items;

decreasing said relevancy rating of said second selected subset of said plurality of informational items by said second predetermined amount; and increasing a relevancy rating of said third selected subset of said plurality of informational items by said first predetermined amount.

24. A computer readable storage medium having stored thereon computer program for implementing a method of implicitly assigning relevancy ratings of a plurality of informational items in an information retrieval system, said computer program comprising a set of instructions for:

detecting an initial user selection of a selected subset of said plurality of informational items;

adjusting a relevancy rating of said selected subset of said plurality of informational items in light of said detected initial user selection;

storing said adjusted relevancy rating for said selected subset of said plurality of informational items;

detecting a user action subsequent to said detected initial user selection;

determining a nature of said user action; and further adjusting said relevancy rating of said selected subset of said plurality of informational items based on said detected nature of said user action, wherein:

said one or more instructions for determining said nature of said user action are adapted to detect a user submission of a question; and wherein said one or more instructions for further adjusting said relevancy rating are adapted to decrease said adjusted relevancy rating of said selected subset of said plurality of informational items by a second predetermined amount, said second predetermined amount being smaller than a first predetermined amount.

25. A computer readable storage medium having stored thereon computer program for implementing a method of implicitly assigning relevancy ratings of a plurality of informational items in an information retrieval system, said computer program comprising a set of instructions for:

detecting an initial user selection of a selected subset of said plurality of informational items;

adjusting a relevancy rating of said selected subset of said plurality of informational items in light of said detected initial user selection;

storing said adjusted relevancy rating for said selected subset of said plurality of informational items;

detecting a user action subsequent to said detected initial user selection;

determining a nature of said user action; and further adjusting said relevancy rating of said selected subset of said plurality of informational items based on said detected nature of said user action, wherein:

said one or more instructions for determining said nature of said user action are adapted to detect a user initiation of a new search; and wherein said one or more instructions for further adjusting said relevancy rating are adapted to decrease said adjusted relevancy rating of said selected subset of said plurality of informational items by a second predetermined amount, said second predetermined amount being smaller than a first predetermined amount.

26. The computer readable storage medium in according to claim 25, wherein said computer program further comprising one or more instructions for:

increasing a relevancy rating of a fourth selected subset of said plurality of informational items by a third predetermined amount, said fourth selected subset of said plurality of informational items being found as a result of said new search, and said third predetermined amount being smaller than said first predetermined amount.

* * * * *